3,488,686
CONCENTRATION PROCESS
William B. Dunwoody and Marion L. Brown, Jr., Yazoo City, Miss., assignors to Mississippi Chemical Corporation, Yazoo City, Miss., a corporation of Mississippi
Filed Apr. 21, 1967, Ser. No. 632,624
Int. Cl. B01d 1/14
U.S. Cl. 159—47                        5 Claims

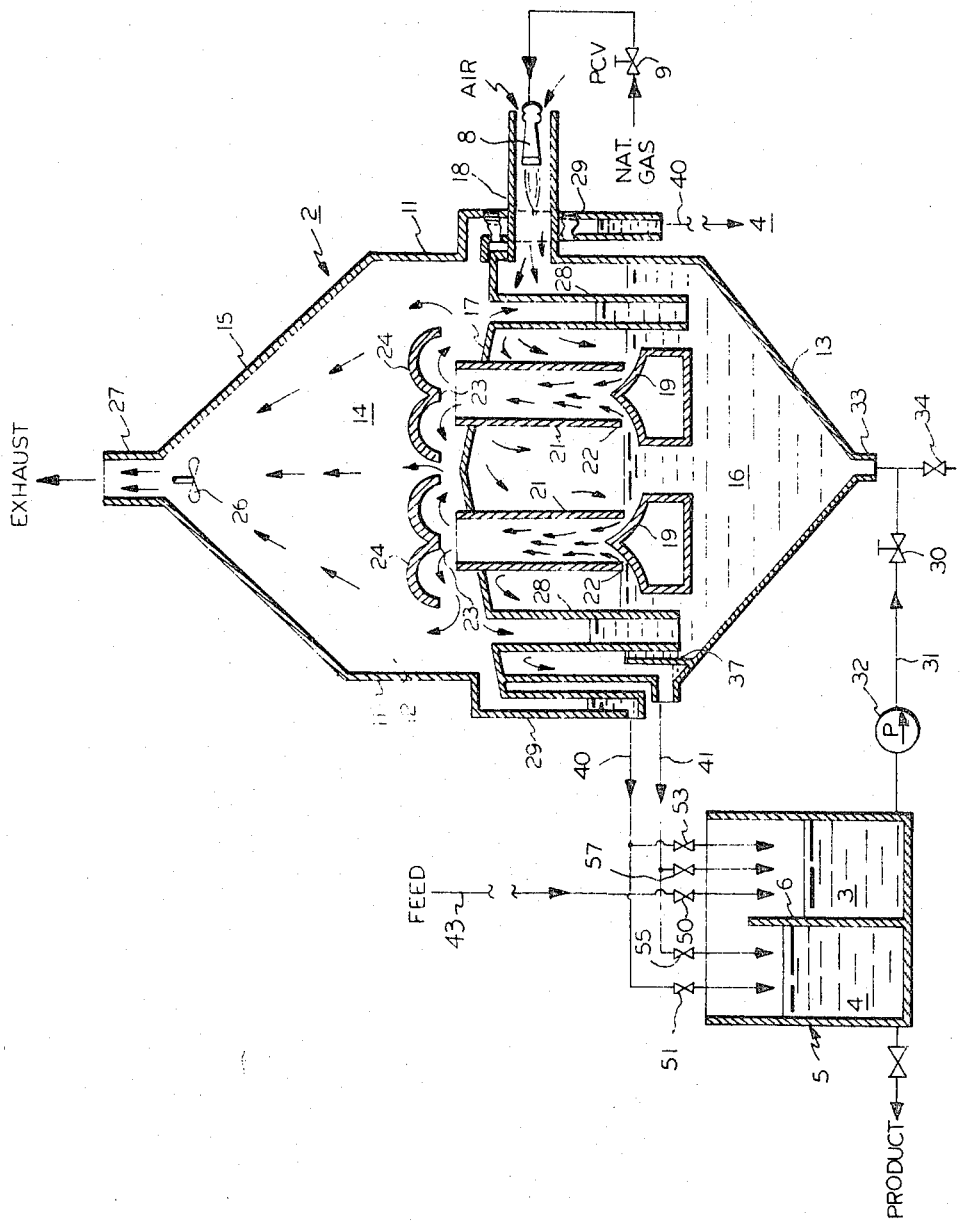

ABSTRACT OF THE DISCLOSURE

Phosphoric acid or other aqueous solution from a reservoir thereof is contacted in dispersed form with hot combustion gases, transported from the reservoir as a turbulent intimate mixture with the hot gases at increased velocity and then separated therefrom, only a small portion of the separated concentrated solution being withdrawn as product; most of it being returned to the reservoir.

SUMMARY OF INVENTION

This invention relates to a process for concentrating aqueous solutions, e.g., phosphoric acid, by contact with hot combustion gases.

The invention sought to be patented, in its process aspect, resides in the concept of dispersing an aqueous solution from a reservoir thereof in a stream of hot combustion gases, transporting the solution from the reservoir with the hot gases as an intimate turbulent mixture, at a velocity greater than the velocity of the gases prior to dispersing the solution therein, separating the transported solution from the gases, and withdrawing a small portion of the separated, thus-concentrated solution as product, the major portion thereof being returned to the reservoir in a cyclic manner so that the volume of liquid circulating in a cyclic manner to and from the reservoir is large in comparison to the volume drawn off as product. In its apparatus aspect, the invention resides in a novel apparatus for performing the process of this invention.

The process can be used to concentrate a variety of aqueous solutions which tend to decompose, cause scaling problems or present an air pollution problem if locally overheated during evaporation with hot combustion gases.

PRIOR ART

Conventional commercial processes in which phosphoric acid is concentrated by direct contact with hot combustion gases produce a serious air pollution problem which is solved only by the use of extremely expensive exhaust gas scrubbing equipment. This pollution problem is primarily the result of localized overheating of the phosphoric acid, which produces fluorides and pyrophosphates in the exhaust gases, which are removed from the gaseous phase only with difficulty. Obviously, the problem can be avoided by reducing the velocity and volume of the combustion gases but this is not an economically feasible solution, as evidenced by the fact that the removal of the contaminants in the exhaust gases rather than avoiding the formation therein has been the prior art approach to the problem.

OBJECTS

It is an object of this invention to provide a novel process for concentrating aqueous solutions, particularly phosphoric acid, with hot combustion gases. Another object is the provision of such a process, substantially free from the prior art problems of equipment scaling, product decomposition and air pollution. Still another object is the provision of a process for the concentration of phosphoric acid by contact with hot combustion gases which in an economically feasible manner avoids the problem of air pollution normally associated with such processes. A further object is the provision of a novel apparatus which may be used to concentrate phosphoric acid and other aqueous solutions without the prior art problems of scaling and/or air pollution. Other objects will be apparent to those skilled in the art to which this invention pertains.

This invention substantially eliminates the air pollution problem, without resorting to elaborate and expensive exhaust gas scrubbing equipment, by contacting acid from a reservoir thereof with the hot combustion gases in finely divided form and transporting it from the reservoir with the hot combustion gases as an intimate turbulent mixture. Efficient heat exchange is thereby assured without the localized overheating which produces particulate pyrophosphates and fluorides and resultant air pollution problems. Scaling of equipment surfaces is avoided by moving the acid during its contact with the hot gases at a velocity substantially greater than the velocity of the acid fed to and removed from the equipment. This rapid movement of acid internally, compared with the rate at which it enters and leaves the equipment, eliminates scaling as a problem, partially because of the flushing action of the rapidly moving acid and partially by ensuring that none of the equipment surfaces exposed to the hot gases and acid become heated substantially above the temperature of the acid.

Apparatus which can be used to practice the present process is a modification of the apparatus disclosed and claimed in U.S. 3,130,024. The patented apparatus is a scrubber for removing particulate impurities from air whereas the modified apparatus used in this process is an evaporator for removing water from phosphoric acid and other aqueous solutions. Other apparatus can be used which employs a Venturi effect to transport acid entrained in combustion gases from a reservoir of acid to a separation chamber and means to recycle the separated acid to the reservoir at a high rate relative to the rate at which feed acid is supplied to and product acid removed from the apparatus.

Apparatus which may be used in the process of this invention is shown in the accompanying drawing in which:

The figure is a sectional schematic view of the apparatus showing its upper and lower compartments and the means whereby liquid is supplied to, removed from and recycled within the apparatus.

Referring now to the drawing, there is shown an evaporator having an elongated generally rectangular casing 2 to which a feed solution is supplied from reservoir 3 and from which the concentrated solution is removed to reservoir 4, formed in tank 5 by weir 6. Liquid is supplied ot reservoir 3 at a rate determined by valve 50. Casing 2 comprises side walls 11 and end walls 12, enclosed by V-shaped bottom 13 and roof 15. An upper compartment 14 is separated from a lower compartment 16, which provides a reservoir for the liquid by a partition 17 which extends between side walls 11. Hot combustion gases, provided by burning natural gas supplied to burner 8 at a rate regulated by pressure control valve 9, enter through inlet 18 into lower compartment 16. A plurality of tubes 21 extend upwardly from the lower compartment 16 to the upper compartment 14 through and slightly beyond partition 17. A plurality of cone-shaped annular baffles 19 in lower compartment 16 are positioned co-axially with and just below the bottom end of each of tubes 21. Liquid is provided in compartment 16, the upper surface or level of which is maintained on the upper curved surface of the cone-shaped baffles 19 so that a thin layer of liquid is formed on the tops of baffles 19. Tubes 21 form a Venturi-like passage between their lower ends 22 and baffles 19. Each baffle 19 comprises a downwardly flaring cone-shaped member having a generally horizontal outer circumferential portion mounted beneath and in spaced relation to the lower end of a tube 21 to define an annular, Venturi-like passage therebetween.

The gases and entrained liquid is directed upwardly in tube 21 by the curved surface of baffles 19 in a generally vertical direction. A divider vane 23 divides the upwardly moving column of gases and entrained liquid between a pair of wing shaped, downwardly curved deflectors 24. Deflectors 24 aid in separating the entrained liquid from the entraining gases and serve as wetted impingement surfaces for the entrained liquid. The inner surfaces of deflector 24 are flushed continuously by the upwardly moving column of liquid and hot gases. An outlet is provided at 27 to remove the combustion gases containing the evaporated water after it has been separated from the concentrated solution. The gases are removed at outlet 27 by fan 26 at a rate which produces a slight vacuum in compartment 14, which facilitates the removal of the gases from compartment 14.

Liquid returns to the lower compartment 16 from the upper compartment 14 through a plurality of internal return conduits 28. External return conduits 29 supply liquid to reservoir 4 and/or if desired, reservoir 3 via conduit 40, the relative proportion being determined by valves 51 and 53. Partition 17 is slanted so that water will flow toward conduits 28 and 29.

Liquid is supplied to compartment 16 from reservoir 3 through conduit 31 by pump 32. Valve 30 is positioned in line 31 to meter the flow of liquid therethrough. An inlet 33 extends from the bottom of compartment 16 and liquid flows through conduit 31 and inlet 33 into compartment 16. Conduit 31 is also provided with a bypass and drain valve 34.

As vacuum is applied at outlet 27 by fan 26, a slight negative pressure differential exists between compartments 14 and 16, the amount of which can be controlled by the volume of combustion gases supplied to compartment 16 and the volume of gas removed from compartment 14 by fan 26. A weir 37 determines the height of the liquid in compartment 16 which, in turn, determines the level of liquid on baffles 19. The difference in height between the surface of liquid in compartment 16 and the height of liquid in return conduits 28 and 29 is equal to the negative pressure differential between compartments 14 and 16. Liquid overflowing weir 37 leaves compartment 16 through conduit 41 to reservoir 3 and, if desired, also reservoir 4, the relative proportion being determined by valves 55 and 57. The liquid pumped by pump 32 from reservoir 3 to compartment 16 is a mixture of feed liquid and liquid which overflows weir 37 into reservoir 3.

Partition 17 and return conduits 28 are designed so that a portion of the liquid which collects on partition 17 passes into external return conduits 29. Thus, product liquid can be transferred from the evaporator to reservoir 4 via conduit 40 and valve 51 or via conduit 41 and valve 55.

In operation, the combustion gases are conveyed into inlet 18 as indicated by the dotted arrows by the ram jet effect produced by the burner 8 positioned in inlet 18. Fan 27 creates a vacuum in compartment 14 so that an updraft is formed in tubes 21 to provide a Venturi-like passage. A thin layer of liquid is formed on the upper surface of the cone-shaped baffles 19 and as the hot gases move between the lower ends 22 of tubes 21 and baffles 19, the thin layer of liquid on baffles 19 is sheared and formed into a spray or mist of fine particles. The baffles 19 direct the hot gases and entrained liquid upwardly through tubes 21 in a generally vertical direction.

Upon reaching the upper ends of tubes 21, dividers 23 divide the upwardly moving stream of hot gases and fine particles of entrained liquid into two portions. The stream is deflected downwardly by the deflectors 24. The particles of liquid entrained in the hot gases are heavier than the gases and are deflected downwardly onto the partition 17. The gases are not as affected by the downward deflection and separate from the liquid to escape into the low pressure area of the upper compartment 14 and to move therefrom through outlet 27.

The liquid collected on partition 17 flows downwardly through conduits 28 and 29 and the portion not transferred to reservoir 4 returns to compartment 16 where it mixes with the liquid in the reservoir and ultimately is again entrained into compartment 14. Thus, a continuous cycle of operation is provided in which a volume of liquid substantially larger than the volume of feed liquid supplied to the system and product liquid withdrawn therefrom is continuously moving in a cyclic fashion from compartment 16 to compartment 14 via conduits 21 and then back again directly to compartment 16 via internal conduits 28 or, indirectly, via external conduits 29, conduit 40, compartment 3, conduit 31 and inlet 33. A predetermined or metered volume of liquid is aspirated with the hot gases and only the layer of liquid on top of the baffles 19 is divided into a mist-like stream which is carried turbulently upwardly within tubes 21 by the pressure differential between compartments 14 and 16.

Flow rate of feed liquid to compartment 3 of tank 5 is determined by valve 50 in conduit 43. Product liquid-flow rate to compartment 4 of tank 5 is determined by valves 51 and 53 in conduit 40 and valves 55 and 57 in conduit 41. By closing valve 51 and opening valve 53, all liquid from compartment 14 is recycled to compartment 16. In the reverse order, all liquid overflowing into external downcomer conduits 29 is taken off as product liquid. Overflow from weir 37 through conduit 41 to compartment 3 is regulated by valve 57. Valve 55 normally is kept closed, unless it is desired to remove liquid from the unit at a faster rate than is possible from downcomer conduits 29.

Aqueous phosphoric acid of all strengths, e.g., from 25 to 55 percent, can be concentrated by the process of this invention to any desired higher strength, i.e., up to 78 percent $P_2O_5$. When concentrating wet process by-product acid, the feed acid usually has a concentration of less than 35 percent $P_2O_5$ and it is ordinarily concentrated to a strength of 36–55 percent $P_2O_5$ or higher. If the process is used to concentrate stronger acid, e.g., first stage wet process phosphoric acid, the feed acid preferably has a concentration of from 40–55 percent $P_2O_5$ and is concentrated to 55 percent or higher, e.g., to superphosphoric acid. Preferably, the feed acid has a strength at least one-fifth less than the desired strength of the product acid.

It will be apparent the process can be used to concentrate other aqueous solutions containing an ingredient or ingredients which, when the solution is evaporated by convention means with hot combustion gases (a) cause an air pollution problem by dispersing a portion of the ingredient in the stack gases, (b) cause scaling, fouling or corrosion problems as a result of localized overheating of the solution with the hot combustion gases and/or precipitation of an ingredient of the solution, or (c) undesirable decomposition of an ingredient of the solution by localized overheating of the solution with the hot combustion gases.

The process is also useful in concentrating other aqueous solutions which cannot readily be concentrated by conventional techniques with hot combustion gases, e.g., brine, sodium sulfate, urea, ammonium sulfate, because of one or more of the problems hereinbefore discussed associated with the prior art processes.

The large volume of liquid recycled internally, compared with the volume of liquid fed to the unit is vital to its proper function. Preferably, the volume of recycled liquid is at least two and can be 10 to 100 or more times the volume of liquid pumped to the unit.

Because of the rapid circulation of liquid between compartments 14 and 16 and reservoir 3, compared with the rate at which liquid is supplied to and removed from the unit, the strength of the liquid in reservoir 4 and compartments 14 and 16 are quite similar when the unit is in equilibrium. Thus, product liquid can, if desired, be withdrawn directly from conduit 40 or 41 instead of reservoir 4.

Description of the unit

A two-tube unit as shown in FIGURE 1, fabricated of 316 stainless steel was used, each tube 21 being 8" in diameter and 28" long. The unit had a rated air capacity of 2000 C.F.M. at the suction of the fan. The burner 8 contained a 7/32" orifice during most of the test runs, although the orifice was changed several times to obtain the desired temperature of the ingoing gases. In addition to handling the products of combustion, the fan 26 pulled air into the inlet duct 18 around the burner.

Start-up

To start a run, reservoir 16 and pump tank reservoir 3 of tank 5 are charged with weak wet process acid (usually 27 percent $P_2O_5$). Acid is taken either directly from the filters or from the clarified acid storage tank. Acid flow is established so that acid overflows the internal weir 37 and returns to compartment 3 through conduit 40. Fan 26 is then started and the level in the unit again raised to overflowing by adding additional acid. To avoid foaming of the acid, fan 26 should run no longer than necessary without the burner operating. Burner 8 is then lit. Inlet gas temperature is slowly brought to about 900° F. Feed acid is added to the pump tank at a rate sufficient to replace the water and acid removed from the unit. Acid is circulated in the unit without taking off product acid until the acid concentration reached the desired concentration, usually about 40 percent or higher. Product acid drawoff is then started and the flow of feed acid to and from the head tank reservoir 4 adjusted to maintain acid level in the pump tank reservoir 3 constant.

Operation

Control of the liquid level in the unit, which is important for satisfactory operation, was achieved with the internal weir 37 installed across one end of the unit as shown in FIGURE 1. Alternatively, conventional level control devices, e.g., a float with maximum and minimum level detectors in association with a flow control valve which regulates the volume of acid pumped to the unit (not shown), can be used instead of the weir, which controls only maximum acid level. For proper dispersion of acid droplets in the tubes level control should be held constant, e.g., within about 1/8".

The gap between the tube 21 and the boot or baffle 19 is an important factor in the amount of evaporation which can be obtained. In the unit used, at a 2" gap the tube acted like a tube full of water with air bubbling through it. There was no real clear cut image of a Venturi effect. With 1½" gap, there was a definite image of a Venturi which extended up into the tube about 8 or 10" and the tube appeared to have many small droplets being carried in a very turbulent manner up through the tubes. The 1½" gap setting therefore offered more contact between the air and liquid and the overall heat transfer coefficient was improved because of the increased turbulence and surface area. If the liquid on the boot 19 is too low, less than optimum liquid is entrained up the tube 21. If the liquid level is too high, more than optimum liquid is entrained, giving the same effect as the 2" gap, i.e., loss of Venturi effect. Therefore, an optimum combination of gap setting and level on the boot 19 exists for each unit. In the unit used, this combination appeared to be a 1½" gap and a depth of liquid on the boots of ½". Tests made at 2" and 1½" settings of the boots (or Venturi cones) indicate a 1½" gap resulted in a higher moisture content in the exit stack 27 than was obtained with a 2" gap. Although air volume was reduced somewhat by changing the gap from 2" to 1½", test data indicated more water evaporation in the unit at the 1½" gap than at the 2" gap.

Entrainment of acid in the exhaust gas was not a problem unless the level dropped below the downcomers. Entrainment occurred only when the feeds were shut off or during start-uyp. The downcomer pipes oughh extend well below the normal operating liquid level to prevent entrainment, e.g., 6 inches or more.

If the liquid level in the unit drops below the bottom end of the downcomer conduits 28, acid is sucked through the downcomers. Since the downcomers have no deflectors and because the air velocity through the downcomers is high, heavy entrainment occurs when acid is sucked through the downcomers. This can occur on start-up, when the level in the unit rapidly drops until sufficient acid is pumped to the unit to bring the level back to normal. The problem can be avoided by increasing the length of conduits 28 or by temporarily closing them during start-up.

No entrainment occurred when acid level in compartment 16 is too high. However, excessively high level causes a decrease in the capacity of the fan. If liquid level goes too high, the tubes become so filled with liquid the fan capacity may drop almost to zero, which can cause flame failure in burner 8.

Run results

The data of Tables I and II are typical data runs in which phosphoric acid was increased in concentration from 27 to 44 percent $P_2O_5$ using the above-described unit. The data shown in Table I gave good heat balances and are believed representative of typical conditions at equilibrium. These data indicate that approximately 1,000 pounds an hour of water can be evaporated in a two-tube unit described herein at the conditions shown in Table I. The data in Table II do not yield accurate material and heat balances, probably because of non-equilibrium conditions.

The unit was used to concentrate both unclarified acid from the filter and clarified acid. Except for deposits in the pump tank, the unit operated equally well with both.

One run was made to determine the maximum concentration which could be obtained from this unit by merely circulating the acid solution without removing any as drawoff. The unit was charged with 41 percent $P_2O_5$ acid and concentrated until the unit had to be shut down due to loss of level. The product acid had 58.83 percent total $P_2O_5$, which means only about 0.3 percent moisture remained. Analyses were run on two samples of this acid to determine percentage non-ortho $P_2O_5$. One sample analyzed 0.27 percent and the other 0.70 percent non-ortho $P_2O_5$, which results are within the accuracy of the test.

According to the data in Table I, 1,500 B.t.u.'s were required to evaporate one pound of water in the unit when concentrating acid from 27 to 44 percent $P_2O_5$. This compares favorably with a submerged combustion unit (concentrating acid from 32.6 to 52 percent $P_2O_5$ acid) which required 1,500 B.t.u.'s to evaporate a pound of water.

For all practical purposes, there was no entrainment of phosphoric acid out the stack of the unit, except when liquid level dropped below the downcomers. Gases from exhaust stack 27 contained only 0.0074 gram of $P_2O_5$, which is below the level of accuracy of the test. However, the analysis established at least 99.8 percent of the $P_2O_5$ feed was recovered.

This is a considerable improvement over submerged combustion units, which exhaust as much as 7 percent of the feed $P_2O_5$ which must be scrubbed out of the exhaust.

Fluorine emission from the unit also was very low. Analysis of exhaust stack gas showed only about 4 p.p.m. (by volume) of fluorine, i.e. about 0.8 pound per day. In a 24-tube unit, which is approximately a plant scale unit for 100 tons per day of $P_2O_5$ feed, the fluorine emission would be about 10 pounds per day under the conditions shown in Table I, which is very low. Fluorine emission from the final scrubber of a submerged combustion evaporator runs from 8 to 38 pounds per day when concentrating acid to 52 percent $P_2O_5$ with an acid temperature of 270° F. Fluorine analyses of the feed acid and product acid showed practically no loss of fluorine, which confirmed the accuracy of stack analyses.

Analyses of the exhaust gas showed no sulfur compounds being emitted. Likewise, sulfate analyses of the acid in and out of the unit on two different occasions showed practically no loss of sulfur compounds.

No sign of deposits of scale were found in the tubes, tube sheet or the downcomers. The only sign of scale build-up was a very slight amount on the outside of the tubes and downcomers right at the liquid level, but this causes little if any operating difficulties.

Table I.—Concentration of phosphoric acid

Feed acid:
- Percent $P_2O_5$ _____ 27
- Sp gravity _____ 1.30
- Temp. _____° F__ 130

Product acid:
- Percent $P_2O_5$ _____ 44
- Sp. gravity _____ 1.56
- Temp. _____° F__ 205

Feed rate of acid:
- Total flow _____lbs./hr__ 2500
- $P_2O_5$ flow _____lbs./hr__ 675
- _____tons/day__ 8

Water evaporated:
- Lbs./hr. _____ 1000
- Tons/day _____ 12

Inlet air temperature:
- Dry bulb _____° F__ 84
- Wet bulb _____° F__ 73

Natural gas flows:
- Measured _____s.c.f.m__ 30
- Corrected for radiation loss _____s.c.f.m__ 25

Inlet gases temp. _____° F__ 900–930

Exit gas:
- Flow at stack conditions _____c.f.m__ 2000
- Flow at standard conditions (60° F. & 14.7 p.s.i.a.) _____c.f.m__ 1540
- Temperature:
  - Dry bulb _____° F__ 200
  - Wet bulb _____° F__ 170

Pressure drop across unit _____ 8½″ ($H_2O$)

What is claimed is:

1. A continuous process for concentrating with hot combustion gases an aqueous solution containing a substance which causes one or more of the problems of air pollution, scaling and decomposition when the solution is locally overheated by the hot combustion gases which comprises the steps of (a) maintaining a reservoir of hot concentrated solution of substantially constant volume in a gas-liquid contacting zone;

(b) maintaining a gas-liquid separation zone at a pressure below that maintained in the gas-liquid contacting zone;

(c) introducing into the contacting zone a stream of hot combustion gases;

(d) internally circulating the concentrated solution between the contacting zone and the separation zone at a high rate, relative to the rate the feed solution is fed to the system and the rate product is withdrawn herefrom, so that the volume of liquid circulating internally is large relative to the volume of solution removed as product, by (i) contacting the stream of hot gases introduced into the contacting zone with a stream of the concentrated solution from the reservoir thereof, in a proportion sufficient to permit the hot gases to be cooled to below the boiling point of water by contact with and evaporation of water from the concentrated solution, and dispersing the concentrated solution in the stream of hot gases by deflecting the stream of hot gases past a thin film of concentrated solution proximate the surface of the reservoir thereof in the contacting zone, thereby aspirating a stream of hot concentrated solution in finely divided form into the stream of hot gases;

(ii) cooling the hot combustion gases to a temperature below the boiling point of water and evaporating water from the hot concentrated solution contacted therewith by transferring the stream of hot combustion gases and stream of finely divided hot concentrated solution contacted therewith as an intimate turbulent mixture at a velocity substantially greater than the velocity of the combustion gases prior to contact with the concentrated solution from the contacting zone to the separation zone through an elongated constricted heat transfer zone originating below and proximate the surface of the reservoir of solution in the contacting zone and terminating in the separation zone;

(iii) separating in the separation zone all the hot concentrated solution from the gases in the transported mixture by deflecting the transported mixture downwardly;

(iv) returning to the contacting zone the hot con-

TABLE II.—CONCENTRATION OF PHOSPHORIC ACID

| | Temperature | | | Stack Gas Flow | | Steam Flow in Stack | | |
|---|---|---|---|---|---|---|---|---|
| Run | Inlet air dry bulb | Stack Gas | | Stack conditions, ft.³/hr. | At 60° F. and 14.7 p.s.i.a., ft.³/hr. | Steam content | At 60° F. and 14.7 p.s.i.a., ft.³/hr. | Lbs./hour |
| | | Wet bulb, ° F. | Dry bulb, ° F. | | | | | |
| 1 | 830 | 170 | 190 | 157,800 | 126,300 | 40.8 | 51,600 | [1] 2,450 |
| 2 | 940 | 183 | 198 | 122,300 | 96,600 | 54.6 | 52,700 | 2,500 |
| 3 | 880 | 158 | 196 | 115,200 | 91,300 | 30.7 | 28,000 | 1,330 |
| 4 | 850 | 160 | 204 | 116,300 | 91,200 | 32.3 | 29,450 | [1] 1,400 |
| 5 | 850 | 162 | 193 | 116,100 | 92,500 | 33.8 | 31,300 | 1,487 |
| 6 | 930 | 174 | 202 | 123,300 | 97,900 | 44.7 | 43,300 | 2,055 |
| 7 | 930 | 173 | 211 | 112,800 | 87,500 | 43.7 | 38,000 | 1,805 |
| 8 | 930 | 168 | 183 | 97,600 | 78,900 | 39.0 | 30,800 | 1,463 |

[1] Water of combustion in stack: 185 lbs./hr.; Water of inlet air in stack: 106–110 lbs./hr.

centrated solution separated from the gases in the separation zone;
(e) inductively exhausting the separated gases from the separation zone at a rate which maintains a vacuum in the separation zone;
(f) thoroughly mixing the solution to be concentrated with the internally circulating hot concentrated solution prior to being contacted with the hot combustion gases; and
(g) feeding the solution to be concentrated to the internally circulating hot concentrated solution and removing as product a portion of the circulating hot concentrated solution at rates substantially less than the rate at which the concentrated solution is circulated internally between the contacting zone and the separation zone.

2. A process according to claim 1 wherein the aqueous solution is aqueous phosphoric acid the volume of which being recycled internally is at least two times the volume fed thereto.

3. The process of claim 2 wherein the concentrated acid has a $P_2O_5$ content of at least 36 percent and the feed acid has a content at least one-fifth less than that amount.

4. The process of claim 2 wherein the feed acid has a $P_2O_5$ strength of less than 35 percent.

5. A process according to claim 2 wherein the volume of phosphoric acid cycled internally is at least 10 times the volume of acid fed thereto and the inlet temperature of the hot combustion gases is about 830° to 940° F.

References Cited

UNITED STATES PATENTS

| | | |
|---|---|---|
| 2,770,295 | 11/1956 | Allen. |
| 2,790,506 | 4/1957 | Vactor _____ 261—121 X |
| 2,905,535 | 9/1959 | Atkin et al. _____ 23—165 |
| 3,130,024 | 4/1964 | Vaughn _____ 55—227 |
| 3,276,510 | 10/1966 | Austin et al. |
| 3,279,526 | 10/1966 | Mustian. |
| 3,104,947 | 9/1963 | Scuitzer et al. |
| 3,404,954 | 10/1968 | Jeffs _____ 23—165 |

FOREIGN PATENTS

| | | |
|---|---|---|
| 1,050,813 | 12/1966 | Great Britain. |

NORMAN YUDKOFF, Primary Examiner

J. SOFER, Assistant Examiner

U.S. Cl. X.R.

23—165; 159—16

PO-1050
(5/69)

UNITED STATES PATENT OFFICE
CERTIFICATE OF CORRECTION

Patent No. 3,488,686      Dated 1970 January 6

Inventor(s) William B. Dunwoody and Marion L. Brown, Jr.

It is certified that error appears in the above-identified patent and that said Letters Patent are hereby corrected as shown below:

In Column 6, Line 35 "data runs" should read --"data for runs"--

In Column 9, Line 21 "concentrated acid" should read --"concentrated product acid"

SIGNED AND
SEALED
JUN 30 1970

(SEAL)
Attest:

Edward M. Fletcher, Jr.
Attesting Officer

WILLIAM E. SCHUYLER, JR.
Commissioner of Patents